(12) United States Patent
Yasuda et al.

(10) Patent No.: US 8,644,694 B2
(45) Date of Patent: Feb. 4, 2014

(54) CAMERA

(75) Inventors: Narihiro Yasuda, Yokohama (JP); Masaharu Hara, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/490,126

(22) Filed: Jun. 6, 2012

(65) Prior Publication Data

US 2013/0142501 A1 Jun. 6, 2013

Related U.S. Application Data

(63) Continuation of application No. 13/067,735, filed on Jun. 22, 2011, now abandoned, which is a continuation of application No. 12/003,966, filed on Jan. 3, 2008, now abandoned.

(30) Foreign Application Priority Data

Jan. 9, 2007 (JP) ................................ 2007-001394
Dec. 18, 2007 (JP) ................................ 2007-325636

(51) Int. Cl.
*G03B 17/00* (2006.01)
*H04N 5/225* (2006.01)
*F28G 7/00* (2006.01)

(52) U.S. Cl.
USPC .................. 396/50; 348/374; 359/507; 15/94

(58) Field of Classification Search
USPC .................. 396/50, 52, 53; 348/208.2, 208.7, 348/208.15, 360, 374; 359/507; 15/94
See application file for complete search history.

(56) References Cited

U.S. PATENT DOCUMENTS

| 2004/0169761 A1 | 9/2004 | Kawai et al. |
| 2005/0104997 A1 | 5/2005 | Nonaka |
| 2005/0280712 A1 | 12/2005 | Kawai |
| 2006/0279638 A1 | 12/2006 | Matsuda et al. |

FOREIGN PATENT DOCUMENTS

| JP | 3727903 | 10/2005 |
| JP | 2006-293036 | 10/2006 |

OTHER PUBLICATIONS

Japanese Office Action mailed Mar. 6, 2012 issued in corresponding Japanese Patent Application No. 2007-325636.
U.S. Office Action from related U.S. Appl. No. 12/003,966; mailed Dec. 22, 2009.
U.S. Notice of Allowance from related U.S. Appl. No. 12/003,966; mailed Jul. 22, 2010.
U.S. Office Action from related U.S. Appl. No. 12/003,966; mailed Dec. 23, 2010.
U.S. Office Action from parent U.S. Appl. No. 13/067,735; mailed Dec. 7, 2011.

*Primary Examiner* — Rochelle-Ann J Blackman

(57) ABSTRACT

To provide a camera that can perform a removal operation for particles adherent to a surface upon which light is incident, of a pickup device and a transmitting member disposed on an optical path of the pickup device in such a condition that the particles are properly removed. According to the present invention, a camera comprises a driving mechanism section to drop and remove particles on a cleaning target that is a surface of an image pickup device and/or a surface of a low-pass filter provided closer to a side of a subject in an optical path than the image pickup device, the subject light passing through the low-pass filter, which is provided with: a tilt sensor to detect an orientation of the camera; and a control section to judge whether a removal operation for the particles by the driving mechanism section should be carried out or not in accordance with the detected value from the tilt sensor.

7 Claims, 9 Drawing Sheets

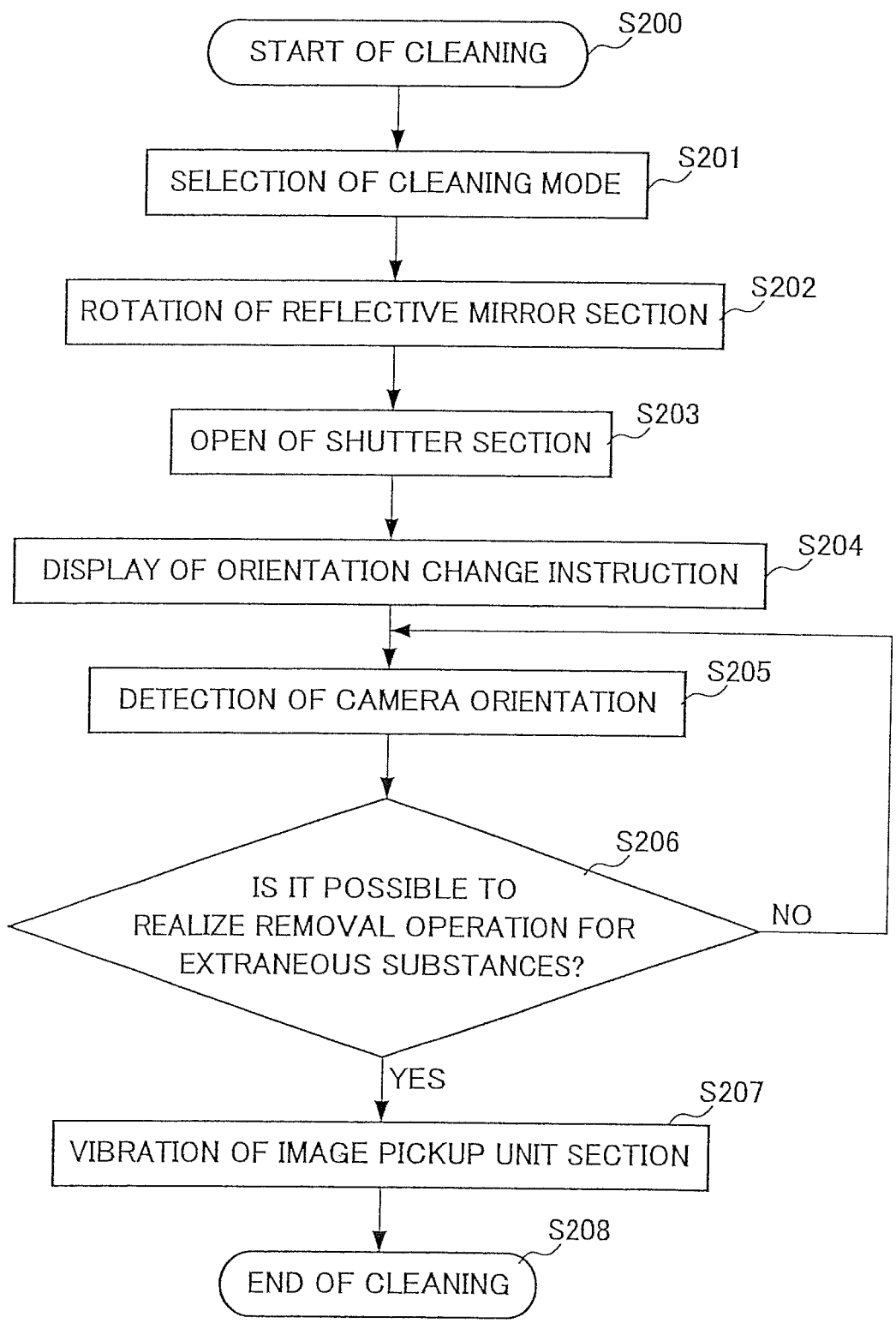

CAMERA

CROSS-REFERENCE TO RELATED APPLICATIONS

This application is a continuation application of U.S. patent application Ser. No. 13/067,735, filed Jun. 22, 2011, now abandoned, which is a continuation application of U.S. patent application Ser. No. 12/003,966, filed Jan. 3, 2008, now abandoned, the disclosures of which are herein incorporated in their entirety by reference. The disclosure of the following priority applications is herein incorporated by reference: Japanese Patent Application No. 2007-001394 filed on Jan. 9, 2007, and Japanese Patent Application No. 2007-325636 filed on Dec. 18, 2007.

BACKGROUND

1. Field

The present invention relates to a camera for shooting a subject.

2. Description of the Related Art

There has been proposed and implemented in various ways a technique for removing particles adherent to a surface of an image pickup device of a digital camera and a surface of a transmitting member such as a low-pass filter placed in the optical path of the image pickup device (for example, see Japanese Patent No. 3,727,903).

The camera of the Japanese Patent No. 3,727,903 has a cleaning function whereby an optical element (transmitting member) placed on an image pickup device is resonated by a vibration exciting means to shake off particles adherent to the optical element and remove them.

The camera having such a cleaning function, however, performs a removal operation for the particles regardless of the orientation of the camera. For this reason, in some cases the particles may not be effectively removed depending on the orientation of the camera.

SUMMARY

An object of the invention is to provide a camera that can perform a removal operation for particles adherent to a surface upon which light is incident, of a pickup device or a transmitting member disposed in an optical path of the pickup device in such a condition that the particles are properly removed.

The present invention achieves the above-mentioned object by the following solution.

According to the present invention, a camera having a cleaning section to drop and remove particles on a cleaning target that is a surface of an image pickup device and/or a surface of a transmitting member provided closer to a side of a subject in an optical path than the image pickup device, the subject light passing through the transmitting member, comprising: a detecting section to detect an orientation of the camera; and a judgment section to judge whether a removal operation for the particles by the cleaning section should be realized or not in accordance with a detected value from the detecting section.

In the camera according to the present invention, the judgment section may judge that the removal operation for the particles by the cleaning section should not be realized when the cleaning target is oriented vertically upwards.

In the camera according to the present invention, the camera may further comprise: an ejecting section to eject the particles dropped by the cleaning section and/or an particle holding section to collect and hold the particles, and the judgment section may judge that the removal operation for the particles by the cleaning section should not be realized when the ejecting section and/or the particle holding section are/is not situated in a direction in which the particles are dropped by the cleaning section.

In the camera according to the present invention, the camera may further comprise a mirror section upon which light from the subject is incident and which reflects the light to the cleaning target and a rotary mechanism section to rotate the mirror section, and when the judgment section judges that the removal operation for the particles should be realized, the judgment section may cause the rotary mechanism section to rotate the mirror section and be adapted to ensure a path through which the particles between the cleaning target and the ejecting section are dropped.

In the camera according to the present invention, the cleaning target may be disposed to orient vertically upwards when the camera is in a normal position.

In the camera according to the present invention, the cleaning section may be provided with a vibrating member to vibrate the cleaning target.

The camera according to the present invention may comprises a control section to control the vibrating member to generate a standing wave selected from among a plurality of standing waves to the cleaning target in the order of selecting.

In the camera according to the present invention, the control section may control the vibrating member to generate a first standing wave in the cleaning target, and then to generate a second standing wave in which a portion corresponding to a node appearing in the first standing wave is vibrated.

In the camera according to the present invention, the control section may control the vibrating member to sequentially generate standing waves in decreasing order of amplitude in a portion in which particles of the cleaning target are present.

In the camera according to the present invention, the control section may be arranged to enable a selection of at least one of: a first control to control the vibrating member to generate a first standing wave in the cleaning target, and thereafter to generate a second standing wave by which a portion corresponding to a node appearing in the first standing wave is vibrated; a second control to control the vibrating member to sequentially generate standing waves in decreasing order of amplitude in a portion in which particles of the cleaning target are present.

In the camera according to the present invention, the vibrating member may be at least one pair of vibrating members arranged across a cleaning target area of the cleaning target, and the control section may perform the control for the vibrating members if the detecting section detects an orientation in which the pair of vibrating members take their respective upper and lower positions in a vertical direction.

In the camera according to the present invention, the vibrating member may be at least one pair of vibrating members arranged across a cleaning target area of the cleaning target, and the control section may perform the control for the vibrating members if the detecting section detects an orientation in which the pair of vibrating members take their respective left and right positions in a vertical direction.

In the camera according to the present invention, two pairs of vibrating members may be provided as the vibrating member, and if the detecting section detects an orientation having a relation in which one pair of vibrating members serve as their respective upper and lower parts in a vertical direction and the other pair of vibrating members serve as their respective left and right parts in a vertical direction, the control section may be arranged to enable to select either the one pair of vibrating members or the other pair of vibrating members.

In the camera according to the present invention, the control section may select any of the first control and the second control in accordance with the detection result in the detecting section.

According to the present invention, it is possible to carry out a removal operation for particles adherent to a surface of an image pickup device or a transmitting member disposed on an optical path of the device upon which light is incident, in such a condition that the particles are properly removed.

BRIEF DESCRIPTION OF THE DRAWINGS

FIG. 3 is an operational flow of a control section when removing particles from an image pickup unit section of a camera, according to a first embodiment;

DETAILED DESCRIPTION

First Embodiment

Now, a more detailed description will be given with reference to the drawings and so on, by way of embodiments of the present invention.

Figure 1A:
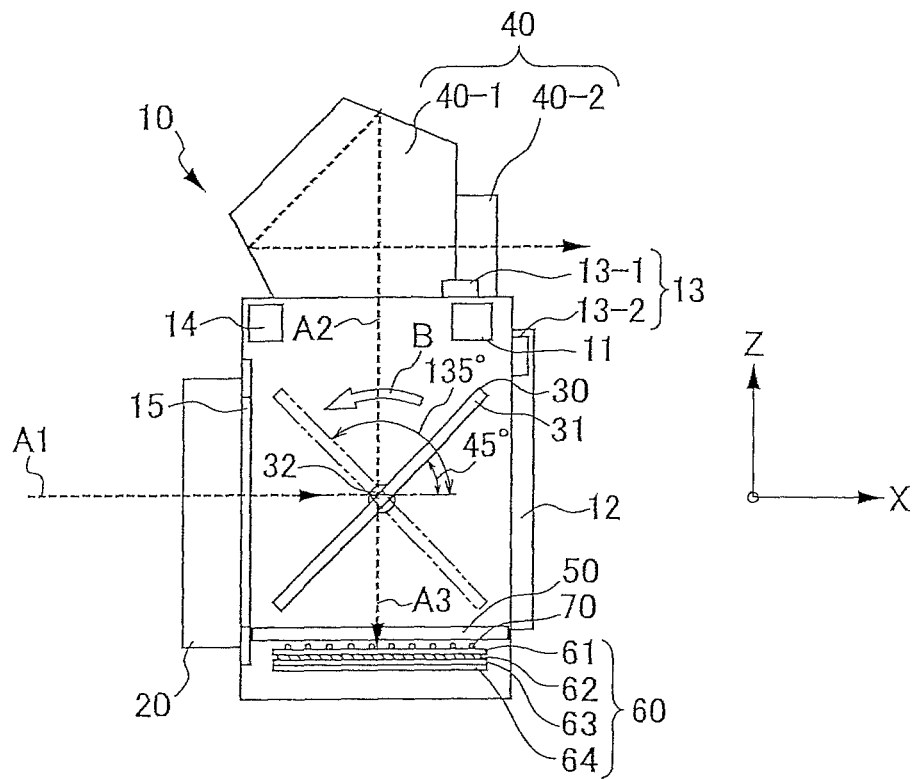
FIG. 1A shows a general configuration of a camera of a first embodiment in its normal position.
Figure 1B:
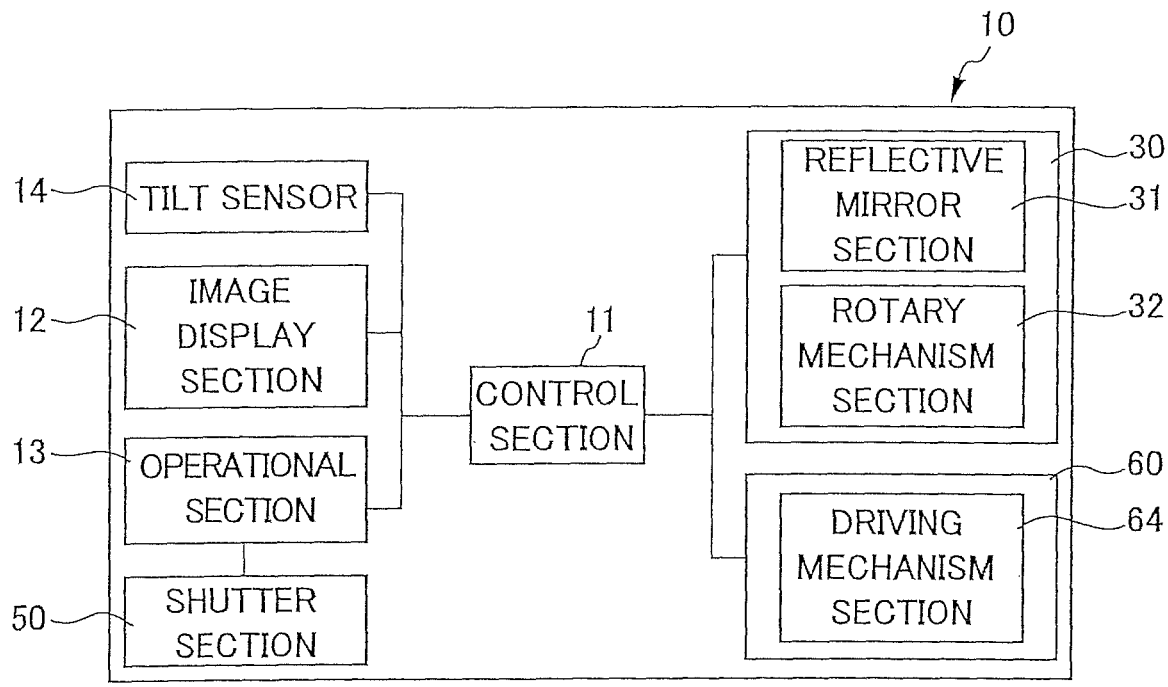
FIG. 1B is a block diagram of a camera control.

FIG. 1 is a schematic illustration showing a camera of a first embodiment according to the present invention, of which FIG. 1A shows a general configuration of the camera in a normal position thereof, and FIG. 1B shows a block diagram of a camera control.

For clarity of the explanation, it should be noted that the left side of FIG. 1A is the front portion of the camera, the right side thereof is the rear portion of the same, the upper side thereof is the upper portion of the same, the lower side thereof is the lower portion of the same, the front side thereof with respect to the paper surface of FIG. 1A is the left portion of the same, and the back side thereof with respect to the paper surface of FIG. 1A is the right portion of the same. In addition, the frontward and backward direction is the X-direction, the upper and lower direction is the Y-direction and the left and right direction is the Z-direction (see FIG. 1A). Moreover, it is assumed that the normal position of a camera corresponds to an orientation of a camera in which the optical axis of the lens section of the camera is horizontal and the longitudinal direction of a shot image is horizontal.

A camera 10 comprises a control section 11, an image display section 12, an operational section 13, a tilt sensor 14, a lens section 20, a mirror unit section 30, a finder section 40, a shutter section 50 and an image pickup unit section 60, as shown in FIG. 1A, which is a digital single-lens reflex camera having a cleaning mode which removes particles 70 adherent to a surface (cleaning target portion) of the image pickup unit section 60.

The control section 11 is provided inside the camera 10 as shown in FIGS. 1A and 1B, and is a CPU for overall control of every part of the camera 10. The control section 11 (judgment section) is also adapted to judge based on a detected value of the tilt sensor 14 whether or not a removal operation should be carried out for the particles 70 on the image pickup unit section 60 described later.

The image display section 12 is provided on a rear portion of the camera 10, which is a liquid crystal display for displaying an image of a subject, information associated with operations, an image of a subject that has been picked up, or the like. Besides, there are displayed a execution state of the removal operation for the particles 70 judged based on the detected value of the tilt sensor 14 by the control section 11, and an indication of whether the removal operation should be curried out or not.

The operational section 13 is provided on an upper portion of the camera 10, which comprises a release switch 13-1 executing shooting of a subject image displayed on the image display section 12 or the finder section 40, and an operational button 13-2 provided on a rear portion of the camera 10 for carrying out setting of the camera 10 and selection of a cleaning mode.

The tilt sensor 14 is provided inside the camera 10, and is a sensor for detecting tilt of the camera 10 from a normal position thereof about the Y-axis.

An attachment section 15 has an opening portion provided to a front portion of the camera 10 for enabling the lens section 20 to be attached thereto. The attachment section 15 (ejecting section) is also used to eject the particles 70 adherent to the image pickup unit section 60 with the lens section 20 being detached therefrom.

The lens section 20 is detachably affixed on the camera 10 via the attachment section 15, and is a lens unit having a function in which light A1 from the subject is incident upon the lens, and scales the subject image up or down in accordance with a purpose of shooting to output it to the mirror unit section 30.

The mirror unit section 30 is provided at a position upon which the light A1 output from a rear portion of the lens section 20 is incident, and is a mirror mechanism for causing the light A1 to be incident upon the finder section 40 or the image pickup unit section 60 appropriately.

The mirror unit section 30 has a reflective mirror section 31 and a rotary mechanism section 32.

The reflective mirror section 31 is a mirror for reflecting the light A1 to the finder section 40 or the image pickup unit section 60.

The rotary mechanism section 32 is provided at both sides of the reflective mirror section 31 in the right-and-left (Y) direction, and is constituted by a rotary mechanism for rotating the reflective mirror section 31 about the Y-axis and a rotary motor for driving the rotary mechanism. The rotary mechanism section 32 rotates the reflective mirror section 31 at a specific angle of rotation so as to enable a reflecting direction of the light A1 to turn toward the finder section 40 or toward the image pickup unit section 60. In the present embodiment, the rotation is made from a situation of inclination of 45 degrees to a situation of inclination of 135 degrees with respect to the light A1 (arrow B). It should be noted that the light A1 incident on the reflective mirror section 31 becomes light A2 as it is reflected to the finder section 40, and becomes light A3 as it is reflected to the image pickup unit section 60.

Additionally, when the particles 70 adherent to a surface of the image pickup unit section 60 are ejected from the camera 10, the rotary mechanism section 32 causes the reflective mirror section 31 to be inclined at 135 degrees with respect to the light A1 so as to secure an ejecting path of the particles 70 from a surface of the image pickup unit section 60 to an opening of the attachment section 15.

The finder section 40 has a Penta Dach Prism 40-1 and an eyepiece section 40-2.

The Penta Dach Prism 40-1 is placed in a position upon which the light A2 reflected when the reflective mirror section 31 is inclined at 45 degrees is incident, which is a polygonal prism for outputting the incident light A2 to the eyepiece section 40-2.

The eye piece section 40-2 is an ocular optical system placed in a position upon which the light A2 output from the Penta Dach Prism 40-1 is incident.

The shutter section 50 is placed in a position upon which the light A3 reflected when the reflective mirror section 31 is inclined at 135 degrees is incident, and regulates incidence of the incident light A3 upon the image pickup unit section 60 in accordance with an operation of the release switch 13-1. The shutter section 50 is also situated on a front surface side of the image pickup unit section 60, described later, and so the shutter section 50 is made to be opened to form an ejecting path for the particles when performing a removal operation of the particles adherent to the image pickup unit section 60.

The image pickup unit section 60 is provided to a position upon which the light A3 passing through the shutter section 50 is incident, which comprises a low-pass filter 61, a coupling member 62, an image pickup device 63 and a driving mechanism section 64. It is noted that the particles 70 adherent to the surface of the image pickup unit section 60, as described above, are actually adherent to a surface (cleaning target portion) of the low-pass filter 61.

The low-pass filter (transmitting member) 61 is an optical filter for eliminating a high-frequency component of the light from the subject to prevent occurrence of interference fringes (Moire) of the subject image.

The coupling member 62 is a packing made from rubber for tightly closing between the coupled low-pass filter 61 and the image pickup device 63, and the tight closure is intended to protect an image pickup surface of the image pickup device 63.

The image pickup device 63 is a CCD (Charge-Coupled Device), which is exposed to the light A3 incident thereon through the low-pass filter 61 and converts it into an electrical image signal to output the signal to the image display section 12.

The driving mechanism section 64 is provided with a driving mechanism and a piezoelectric device, which is a mechanism for vibrating the image pickup unit section 60 in a direction perpendicular to the light A3 (in a plane of the image pickup surface) so as to vibrate the particles 70 adherent to a surface of the low-pass filter 61 upon which the light A3 is incident for their removal.

Figure 2A:
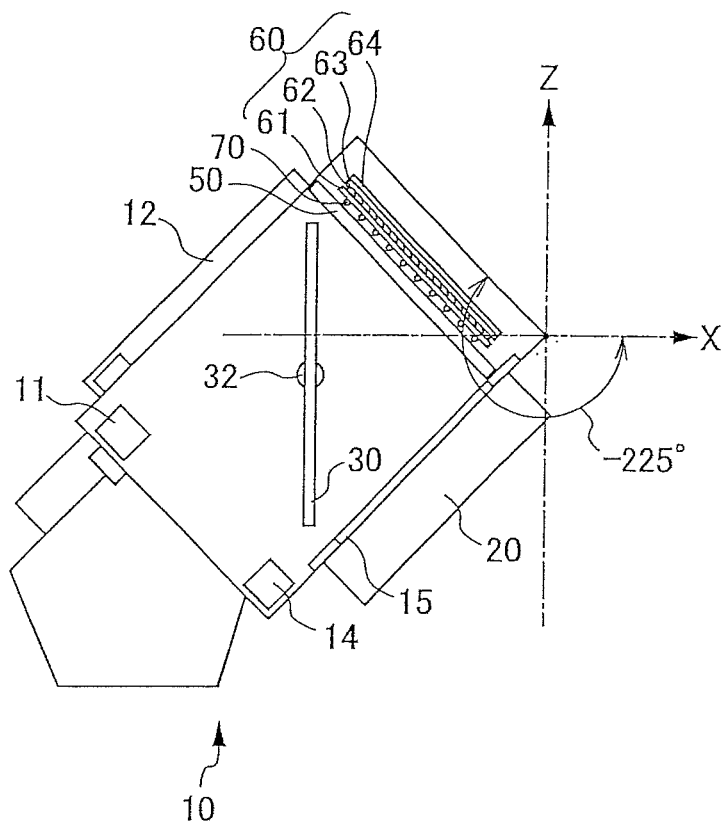
FIG. 2A is an illustration for explaining a removal operation for particles when the amount of tilt of a camera about the Y-axis is −225 degrees.
Figure 2B:
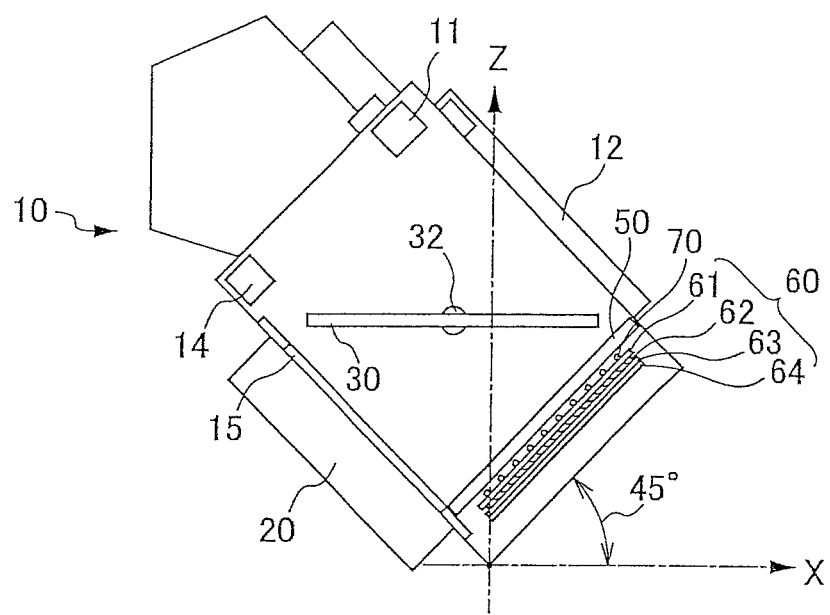
FIG. 2B is an illustration for explaining a removal operation for particles when the amount of tilt of a camera 10 about the Y-axis is +45 degrees.

It should be noted that the tilt sensor 14 detects the amount of tilt of the camera 10 about the Y-axis with respect to a normal position of the camera 10, the control section 11 judges in dependence on the detected value whether or not to carry out a removal operation for the particles 70, and the driving mechanism section 64 operates based on this judgment. FIG. 2A is an illustration for explaining a removal operation for particles when the amount of tilt of the camera 10 about the Y-axis is −225 degrees. FIG. 2B is an illustration for explaining a removal operation for particles when the amount of tilt of the camera 10 about the Y-axis is +50 degrees. In the present embodiment, the control section 11 judges that the removal operation for the particles 70 should not be carried out when the orientation of the camera 10 has an inclination with the amount of tilt about the Y-axis being within a range between −225 degrees and +45 degrees with respect to a normal position of the camera 10, as shown in FIG. 2.

This is because the particles 70 can not be made to fall from a surface of the image pickup unit section 60 to an opening of the attachment section 15 due to a positional relations of the image pickup unit section 60 and the attachment section 15 when the camera 10 keeps its orientation within a range between −225 degrees and +45 degrees from its normal position. In addition, particularly when the inclined orientation is kept within a range between −45 degrees and +45 degrees, an entrance surface (image pickup surface) of the image pickup unit section 60 for the light A3 is oriented substantially upward (in a +Z direction), so that the particles 70 lying on the entrance surface mostly do not fall and cannot be sufficiently removed from the image pickup unit section 60 even if the driving mechanism section 64 operates.

The particles 70 are dust contaminating from the outside of the camera 10 and/or dust generated by sliding sections within the camera 10.

Now, an explanation will be given concerning operations of the camera 10. FIG. 3 is an operational flow of the control section 11 when removing the particles 70 from the image pickup unit section 60 of the camera 10. FIG. 4 is an explanatory illustration at the time of removing the particles 70 from the image pickup unit section 60 of the camera 10.

Figure 4A:
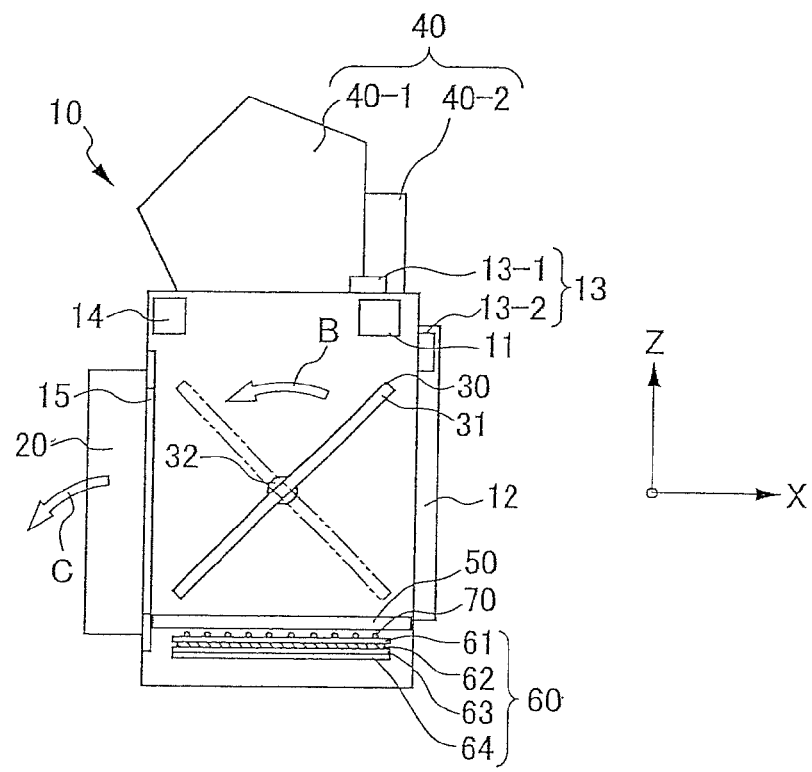
FIG. 4A is an illustration showing a camera when its orientation is at zero degrees with respect to a normal position.

When performing the cleaning for the image pickup unit 60 of the camera 10 as shown in FIG. 3 (S200), a photographer begins by detaching the lens section 20 from the attachment section 15 of the camera 10 (an arrow C in FIG. 4A) as shown in FIG. 4A, and then selects a cleaning mode using the operational button 13-2 (S201). Upon the selection of the cleaning mode, the control section 11 causes the rotary mechanism section 32 to rotate the reflective mirror section 31 in inclination at 135 degrees with the light A1 (S202, an arrow B in FIG. 4A), and opens the shutter section 50 (S203). The control section 11, next, operates to display the orientation change instruction on the image display section 12 for the photographer to incline the orientation of the camera 10 at any angle outside of the range between −225 degrees and +45 degrees (from +45 degrees to +135 degrees) with respect to the normal position (S204). After displaying the orientation change instruction, the control section 11 causes the tilt sensor 14 to detect the amount of tilt of the camera 10 from the normal position (S205), and judges whether the removal operation for particles should be realized or not based on the detected value of the tilt sensor 14 (S206).

If the orientation of the camera 10 is within a range between −225 degrees and +45 degrees with respect to the normal position as shown in FIGS. 2A and 2B, then the control section 11 judges that the removal operation should not be realized (S206: NO), and stays on standby until the orientation of the camera 10 is appropriately changed by the photographer.

Figure 4B:
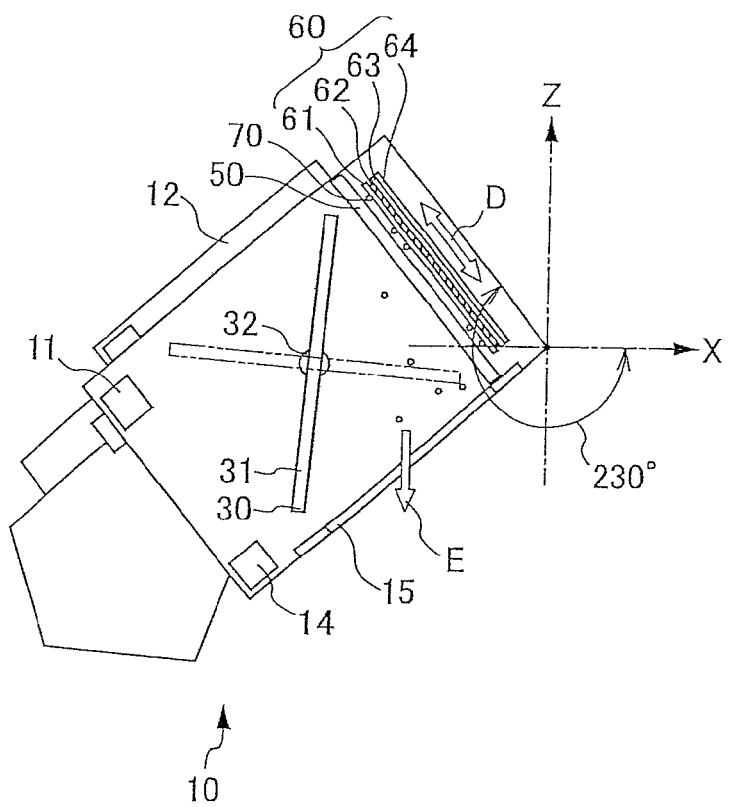
FIG. 4B is an illustration showing a camera when its orientation is beyond a range of −230 degrees.

FIG. 4A is an illustration showing an occasion on which the orientation of the camera 10 is at zero degrees with respect to the normal position, and FIG. 4B is an illustration showing an occasion on which the orientation of the camera 10 is outside of the range (for example, at −230 degrees).

If the orientation of the camera 10 is outside of a range between −225 degrees and +45 degrees with respect to the normal position (for example, at −230 degrees, in FIG. 4B), then the control section 11 judges that the removal operation for the particles 70 should be carried out (S206: YES), and causes the driving mechanism section 64 to be driven to vibrate the image pickup unit section 60 (S207, an arrow D in FIG. 4B). By vibrating the image pickup unit section 60, the particles 70 adherent to a surface of the low-pass filter 61 fall and are ejected to an outside of the camera 10 through the opened shutter section 50 and the attachment section 15 (an arrow E in FIG. 4B). After a specified time elapses, the vibration of the image pickup unit section 60 is stopped, the image display section 12 is caused to display an indication that the cleaning has been completed, and the cleaning mode is ended (S208).

In the foregoing context, the camera of the present embodiment has advantages as follows.

(1) Since the camera 10 is provided with the tilt sensor 14 for detecting the orientation of the camera and the control section 11 for judging whether or not the removal operation for the particles 70 using the driving mechanism section 64 of the image pickup unit section 60 should be carried out, the removal operation for the particles 70 with the driving mechanism section 64 can be prohibited when it is judged that the particles 70 cannot be removed based on the orientation of the camera 10, thereby avoiding a situation where the particles cannot be effectively removed, to make it possible to surely remove the particles from a surface of the low-pass filter 61.

(2) Since the control section 11 judges that the removal operation for the particles 70 using the driving mechanism section 64 should not be realized when the orientation of the camera 10 corresponds to an inclination of an amount of tilt within a range between −225 degrees and +45 degrees about the Y-axis with respect to the normal position, the particles 70 shaken by the driving mechanism section 64 can be passed through the shutter section 50 and the attachment section 15 to be surely ejected from the camera 10.

(3) Since camera 10 is provided with a reflective mirror section 31 on which the light from the subject is incident and which reflects it to the image pickup unit section 60 and a rotary mechanism section 32 for rotating the reflective mirror section 31, the control section 11 can cause the rotary mechanism section 32 to rotate the reflective mirror section 31 to ensure a path for the particles 70 between a surface of the image pickup unit section 60 and an opening of the attachment section 15 to fall when judging that the removal operation for the particles 70 should be realized.

Modification

Various modifications and variations can be made without limitation of the embodiment described above.

(1) In the present embodiment, the control section 11 judges that the removal operation for the particles 70 of the image pickup unit section 60 using the driving mechanism section 64 should not be realized when the camera 10 has an orientation within a range between −225 degrees and +45 degrees from the normal position, but other angle ranges may be set. For example, the surface of the low-pass filter 61 to which the particles 70 would adhere may be more smoothened to facilitate the removal of the particles 70 even if the angle at which the image pickup unit section 60 is inclined is made smaller. More specifically, although the present embodiment is intended to judge that the removal operation for the particles 70 should be realized in the case where the orientation of the camera 10 is at more than +45 degrees, it may be set to realize the removal operation at more than +30 degrees by virtue of a smoothing treatment of the surface of the low-pass filter 61.

(2) Although the present embodiment is intended to cause the driving mechanism section 64 to integrally vibrate the low-pass filter 61 and the image pickup device 63, only the low-pass filter 61 may be vibrated.

(3) In the present embodiment, the driving mechanism section 64 integrally vibrates the low-pass filter 61 and the image pickup device 63 so as to perform the removal operation for the particles 70, but it may be concurrently used as a driving section of a vibration reduction mechanism for correcting blurring caused by hand or the like at the time of image shooting of the camera 10.

(4) In the present embodiment, the surface of the low-pass filter 61 is used as a cleaning target, but any surfaces of other transmitting members such as a protective filter and the like may be used as the target.

Second Embodiment

Figure 5:
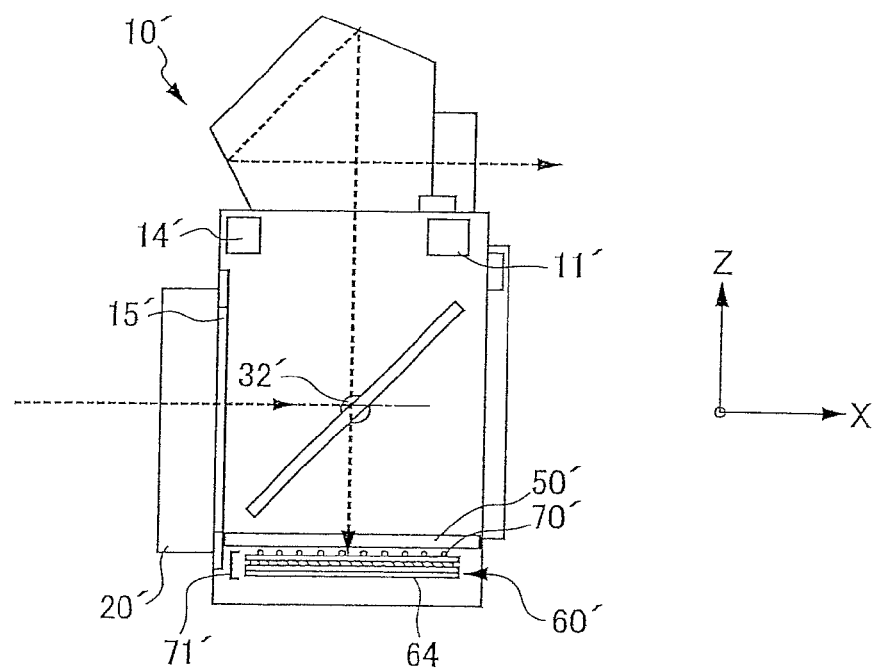
FIG. 5 is a schematic illustration showing a camera of a second embodiment.

FIG. 5 is an illustration showing the overall construction of a camera of the second embodiment of the present invention in a normal position of the camera. Components similar to those in the first embodiment are omitted from the description in the second embodiment. In the second embodiment, a particle holding section 71' is provided for collecting the particles and holding them. Particles 70' removed from the image pickup unit section 60' are not ejected from an attachment section 15' of a lens section 20'. The particle holding section 71' is disposed in a space where the image pickup unit section 60' is placed on an inner side of a shutter section 50'.

A rotary mechanism section 32' has a construction similar to that in the first embodiment, but there is no need to eject the particles 70' adhering to the surface of the image pickup section 60' from the camera 10' and thereby its rotation for ensuring the ejecting path does not take place.

In addition, as described above, the particle holding section 71' is disposed in a space where the image pickup unit section 60' is situated. For this reason, the shutter section 50' does not open on the occasion of the removal operation for the particles adhering to the image pickup unit section 60'. The shutter section 50', however, may be opened, for example in the case where the particle holding section 71' is detached to the outside of the camera 10' in order to clean the particle holding section 71'.

This construction is the same as in the first embodiment in that a tilt sensor 14' detects the amount of tilt of the camera 10' about the Y-axis with respect to the normal position of the camera 10', a control section 11' judges whether or not to carry out the removal operation for the particles 70' in accordance with the detected value, and the driving mechanism section 64 operates in dependence upon this judgment. However, the particles fall to a tray in the case where the orientation of the camera 10' has an amount of tilt of a range from no less than zero degree to substantially 90 degrees about the Y-axis with respect to the normal position. Therefore, in the case of other ranges than it, the control section 11' judges that the removal operation for the particles 70' should not be carried out.

According to the camera of the second embodiment, the particles can be collected in the particle holding section 71' in addition to the advantages of the camera of the first embodiment.

Third Embodiment

Figure 6:
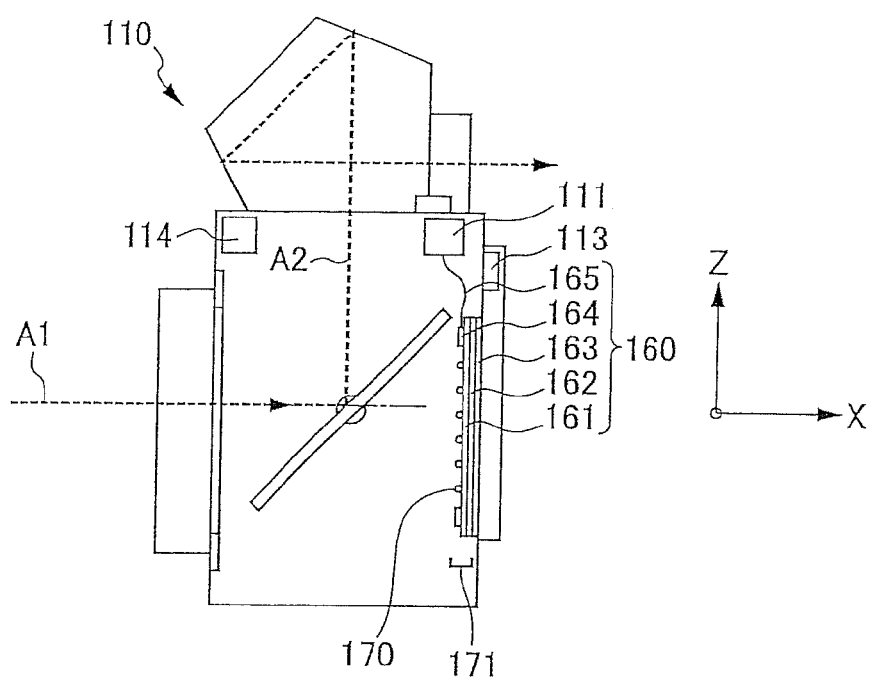
FIG. 6 is a schematic illustration showing a camera of a third embodiment.

FIG. 6 is an illustration showing a general construction of a camera 110 of the third embodiment of the present invention in a normal position of the camera. Components similar to those in the first embodiment are omitted from the description in the third embodiment. A difference between the third embodiment and the first embodiment is that an image pickup unit section 160 is disposed at a rear portion of the camera 110.

In addition, the construction of the image pickup unit section 160 is different. As shown in FIG. 6, the image pickup unit section 160 is constructed such that an image pickup device 163, a coupling member 162 and a low-pass filter 161 are arranged in this order from the image side. Further on the subject side of the low-pass filter 161, a pair of vibrating members 164 is disposed as a driving mechanism section. The vibrating members 164 are piezoelectric devices, which are bonded along an edge extending in an up-and-down direction of the low-pass filter 161 in the vicinity of upper and lower ends of the subject side surface of the low-pass filter 161.

The vibrating members 164 are each electrically connected with a control section 111 by a flexible printed board 165. The vibrating members 164 vibrate by being driven by a driving signal having a predetermined frequency, output from the control section 111. If the vibration is transferred to the low-pass filter 161, then the low-pass filter 161 itself vibrates for the particles adhering to the front side surface of the filter to be shaken down.

The control section 111 is provided inside the camera 110 as with the first embodiment, and is a CPU for generally controlling every part of the camera 110. The control section 111 can control the vibrating members 164 selectively between a first control mode and a second control mode. The first control mode is a mode for controlling the vibrating members 164 to generate a first standing wave in the low-pass filter 161, subsequently to generate a second standing wave in which a portion corresponding to a node appearing in the first standing wave is vibrated, and then to generate a third standing wave in which a portion corresponding to a node appearing in the second standing wave is vibrated. The second control mode is a mode for controlling the vibrating members 164 to sequentially generate standing waves in decreasing order of amplitude to a portion of the low-pass filter 161 where the particles are present. Selection of either a first vibration mode or a second vibration mode can be performed by an operational button 113 on a rear face of the camera 110.

A tilt sensor 114 detects tilt of the camera 110 about the X-axis from the normal position in the third embodiment. In addition, a particle holding section 171 is disposed below the image pickup unit section 160 (in a Z-minus direction).

Figure 7:
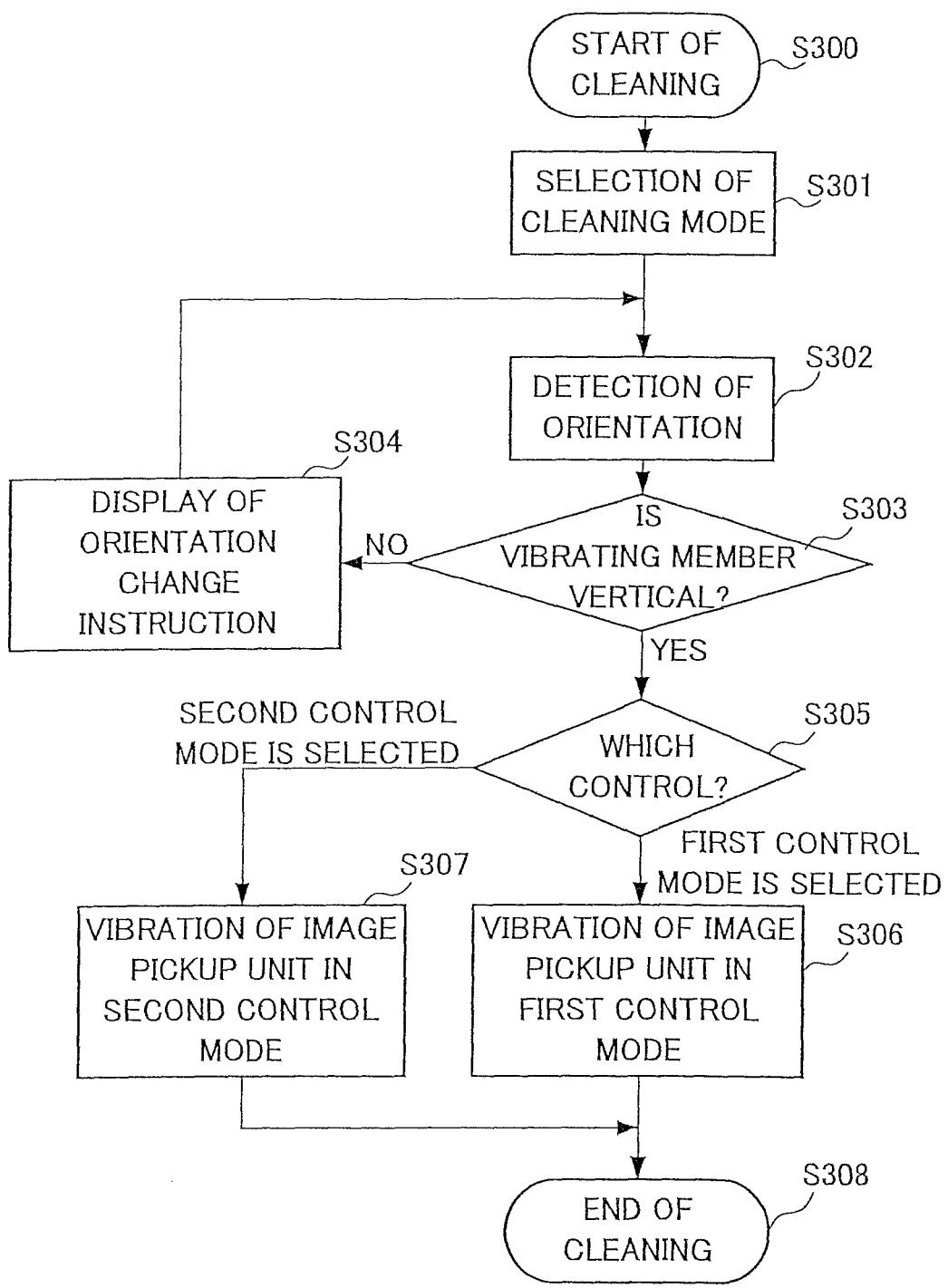
FIG. 7 is an operational flow of a control section when removing particles from an image pickup unit section of a camera, according to a third embodiment.

Now, the operation of the camera 110 will be explained. FIG. 7 is an operational flow of the control section 111 when the particles 170 are removed from the image pickup unit section 160 of the camera 110. When the photographer wants to realize the cleaning for the image pickup unit section 160 of the camera 110 into operation (S300), he/she begins by selecting a cleaning mode using the operational button 113 (S301).

Next, the control section 111 receives a detection result of the orientation of the camera 110 from the tilt sensor 114 (S302). The control section 111 judges based on the detection result of the orientation, whether or not the camera 110 has such an orientation that the pair of vibrating members 164 have their respective upper and lower positions in a vertical direction in the image pickup unit section 160 (S303). If it is judged that the camera does not have such an orientation that the pair of vibrating members 164 take their respective upper and lower positions in a vertical direction (S303, NO), then an instruction to change the orientation of the camera 110 is given (S304). This instruction is realized in the image display section 112. On the other hand, if the control section 111 judges based on the detection result of the orientation that the camera 110 has such a orientation that the pair of vibrating members 164 take their respective upper and lower positions in a vertical direction in the image pickup unit section 160 (S303, YES), then the control section 111 inquires which control should be selected, the first control mode or the second control mode (S305).

If the first control mode is selected, then the vibrating members 164 are controlled to generate the first standing wave in the low-pass filter 161 and thereafter to generate the second standing wave in which a portion corresponding to a node appearing in the first standing wave is vibrated (S306).

Figure 8:
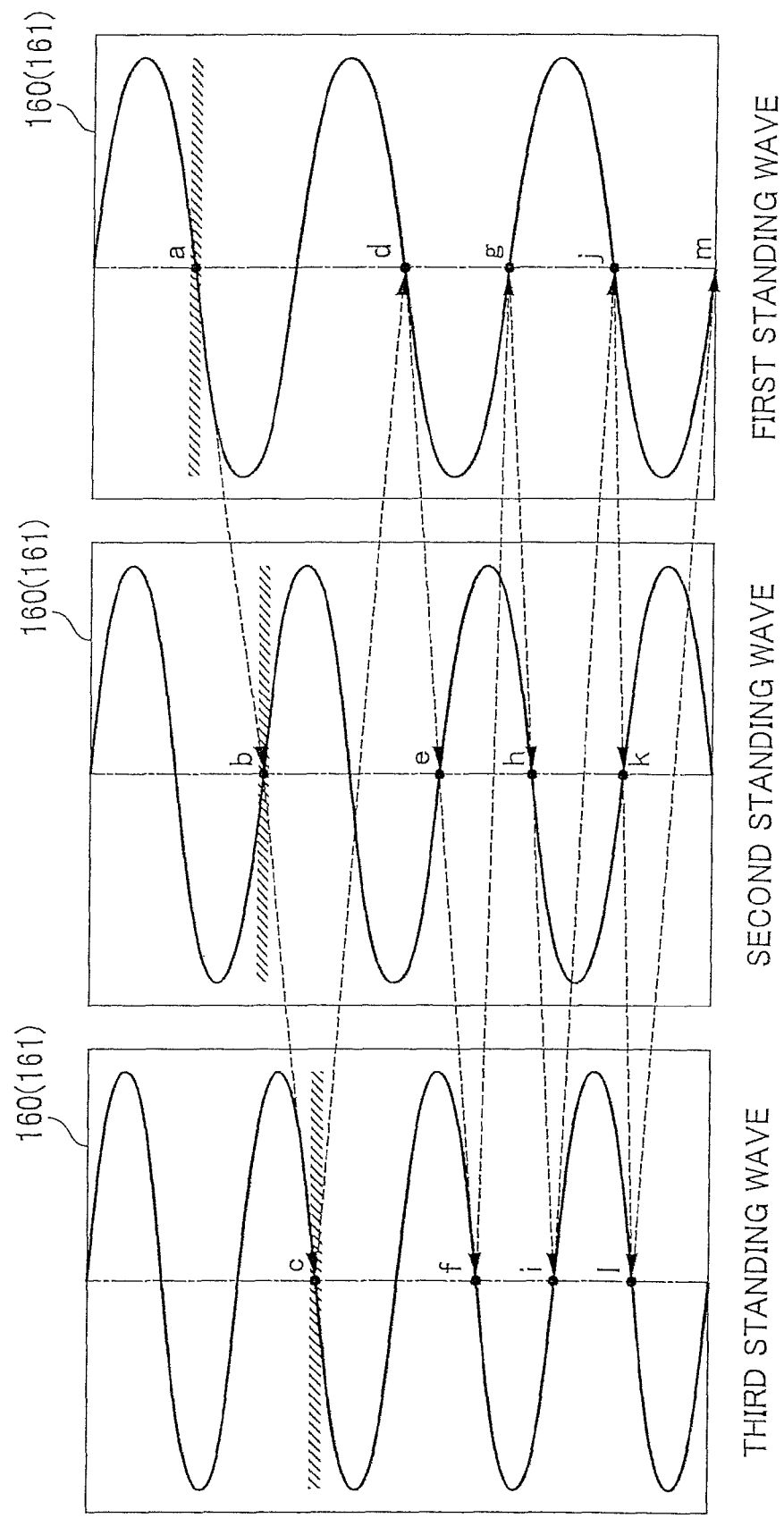
FIG. 8 is an illustration showing a state of occurrence of a standing wave on a low-pass filter.

FIG. 8 is an illustration showing the state of occurrence of the standing waves in the image pickup unit section 160 (low-pass filter 161), wherein specifically shown are the state of occurrence of the first standing wave in the low-pass filter 161, the state of occurrence of the second standing wave in the low-pass filter 161, and the state of occurrence of the third standing wave in the low-pass filter 161. It should be noted that any standing waves caused in the image pickup unit section 160 are longitudinal waves in practice, but the illustration is made with lateral waves for the sake of ease of understanding.

If the image pickup unit section 160 is vibrated with the generation of standing waves, then the particles on the low-pass filter 161 fall because of the vibration. However, node portion "a" (a position in the same horizontal direction as "a" shown by oblique strokes in the right-hand figure) may easily collect particles. In this case, those particles do not readily fall down even if a standing wave having the same frequency continues to be applied. For this reason, the second standing wave is subsequently generated on the low-pass filter 161 such that a portion corresponding to a node appearing in the first standing wave is vibrated, as shown in the middle figure. By doing so, the portion "a" of the node, in which the particles have been collected, is vibrated, thereby the particles of the portion "a" gradually fall.

Again, in this case, however, particles may be collected at a node portion "b" of the second standing wave (a position in the same horizontal direction as "b" shown by oblique strokes in the middle figure). Also in this case, the dust does not readily fall even with continuous application of a standing wave of the same frequency. For this reason, next such a third vibration is added that the third standing wave is caused to vibrate a portion "b" corresponding to a node appearing in the second standing wave. By so doing, the portion "b" of the node in which the particles have collected is vibrated, and so the particles at the portion "b" fall.

Also in this situation, again the particles may be collected in a node portion "c" of the third standing wave (a position in the same horizontal direction shown by oblique strokes in the left-hand figure), but then the first standing wave is added again. By repeating these procedures, the particles will fall by way of the portion "a", the portion "b", the portion "c", the portion "d", . . . , one after another. In this way, the particles are dropped ultimately to the lowest position "m" of the low-pass filter 161.

For example, after the first standing wave, the second standing wave and the third standing wave are repeated and each occurs three times, the vibration of the image pickup unit section 60 is stopped, an indication that the cleaning has been completed is displayed on the image display section 12, and the cleaning mode is ended (S308).

If the second control mode is selected, then a portion on which the particles are present on the low-pass filter 161 is identified, and the portion on which the particles as objects to be removed are present is subjected to occurrence of a standing wave having the greatest amplitude of the standing waves that can be generated by the control section 111. Then, a standing wave having the second greatest amplitude is subsequently generated, and from then on the standing waves are generated with different amplitudes sequentially. For example, the standing waves having large, middle, small amplitudes are generated. After these standing waves are repeatedly generated, for example three times, the vibration of the low-pass filter 161 is stopped, the indication that the cleaning has been completed is displayed on the image display section 112, and the cleaning mode is over (S308).

In the way of the foregoing, the camera of the third embodiment has advantages as follows.

(1) In the first control mode, the control section 111 controls the vibrating members 164 to generate the first standing wave in the low-pass filter 161, thereafter to generate the second standing wave in which a portion corresponding to a node appearing in the first standing wave is vibrated, and then to generate the third standing wave in which a portion corresponding to a node appearing in the second standing wave is vibrated. In this way, the particles on a surface of the low-pass filter 161 can be dropped to the bottom without being collected in the node portion "a" of the specified standing wave.

(2) In the second control mode, the control section 11 identifies a portion on which the particles are present on the low-pass filter 161 using an already-known method, for example, and controls the vibrating members 164 to sequentially add a plurality of selected standing waves to the portion on which the particles as objects to be removed are present in decreasing order of amplitude. By adding a standing wave having the largest (larger) amplitude first, the adhesiveness of the particles is weakened, and thereby after that, the particles can be dropped even with a standing wave having smaller amplitude.

Modification

Various modifications and variations can be made without limitation of the above-described embodiments.

(1) The third embodiment is intended to generate the standing waves in the order of a first standing wave, a second sanding wave and a third standing wave, but the invention is not limited this manner, and for instance, generation may be made in the order of the second standing wave, the first standing wave, the third standing wave after the first standing wave, the second standing wave and the third standing wave are generated, for example. In addition, the control section 11 may calculate the order in which the particles on the portion "a" shown in FIG. 8 fall down the fastest, and the vibration may be generated in the calculated order.

Figure 9:
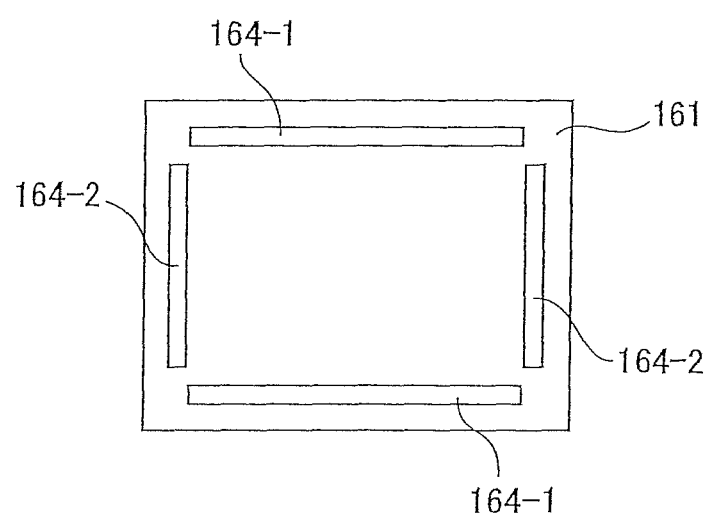
FIG. 9 is an illustration showing attached positions of vibrating members on a low-pass filter.

(2) Although the third embodiment is intended to mount a set of vibrating members 164 on the upper and lower portions of the low-pass filter 161, the invention is not limited to this manner. As shown in FIG. 9, one pair of vibrating members 164-1 may be bonded along the upper and lower edges of the subject side surface of the low-pass filter 161, and the other pair of vibrating members 164-2 are bonded along the left and right edges of the subject side surface of the low-pass filter 161. In this situation, if the detecting section 114 detects the camera 110 being in an orientation having a relation in which the one pair of the vibrating members 164-1 take their respective upper and lower positions in a vertical direction and the other pair of the vibrating members 164-2 take their respective left and right positions in a vertical direction, then the control section 111 may enable to select either the one pair of vibration members 164-1 or the other pair of vibrating members 164-2.

(3) In the third embodiment, the first mode may be selected when a detected orientation has a relation in which the one set of vibrating members 164 take their respective upper and lower positions in a vertical direction, and the second control mode may be selected when a detected orientation has a relation in which the one set of vibrating members 164 take their respective left and right positions in a vertical direction. In this way, it is possible to start to smoothly and efficiently drop the dust adhering thereto that has a great coefficient of static friction.

Figure 10:
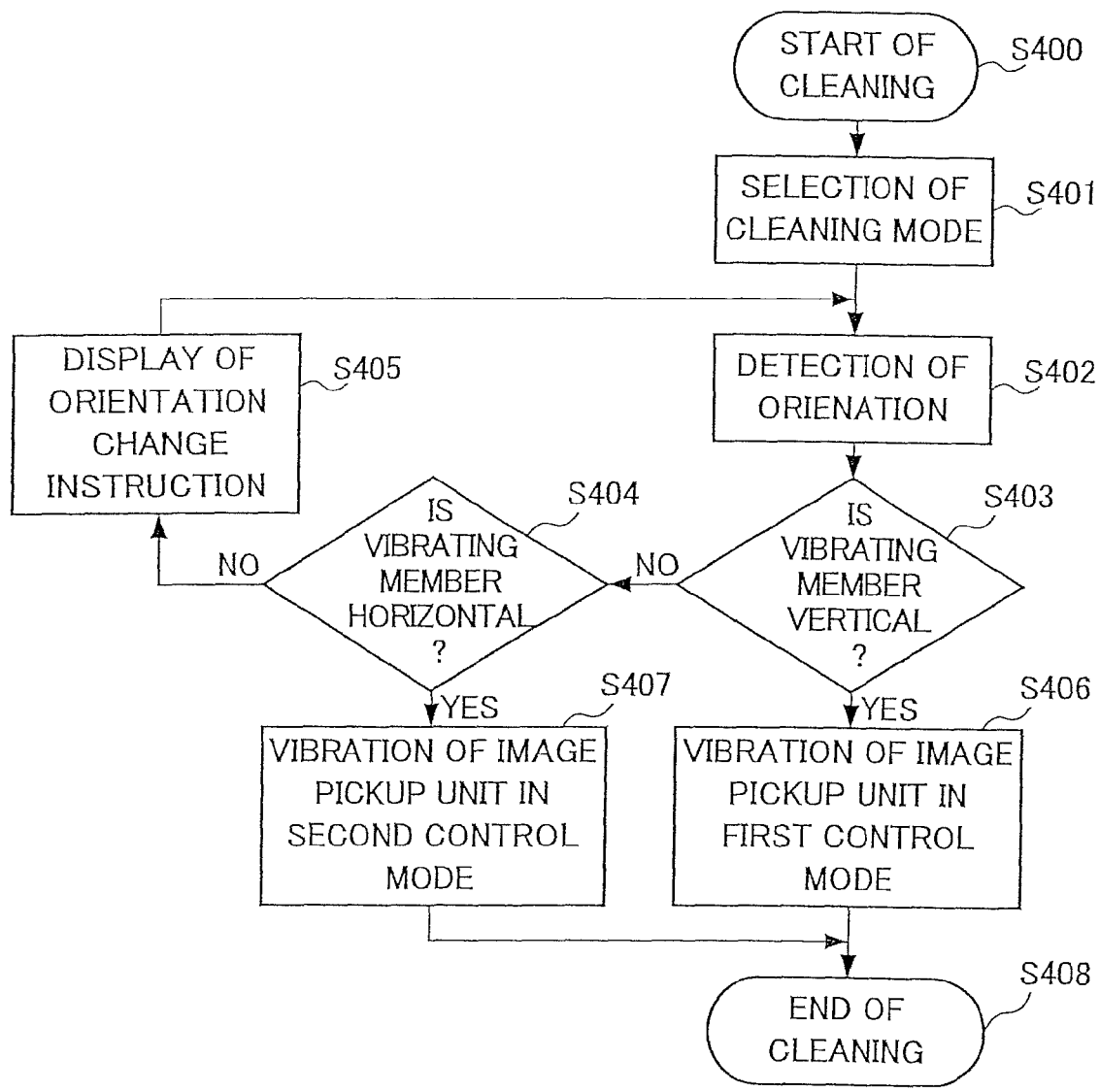
FIG. 10 is an operational flow of a control section when removing particles from an image pickup unit section of a camera, according to a modified form of the third embodiment.

FIG. 10 is an operational flow of the control section 11 in this case. The photographer at first selects a cleaning mode using the operational button 113 (S401), as with the third embodiment. The control section 111 receives the detection result of a orientation of the camera 110 from the tilt sensor 114 (S402). The control section 111 judges based on the detection result of the orientation whether the camera 110 has an orientation in which the pair of vibrating members 164 occupy their respective upper and lower locations in a vertical direction in the image pickup section 160 (S403). If NO in the step S403, then the control section 111 subsequently judges whether the pair of vibrating members 164 occupy their respective left and right locations in a vertical direction in the image pickup unit section 160 (S404). If NO in the step S404, the control section 111 instructs an orientation change for the camera 110 (S405). On the other hand, if YES in the step S403, the first control mode is selected, and after the cleaning has been performed in the first mode, the cleaning is ended (S408). If YES in the step S404, the second control mode is selected, and after the cleaning has been performed in the second mode, the cleaning is ended (S408).

What is claimed is:

1. A camera having a cleaning section to drop and remove particles on a cleaning target that is a surface of an image pickup device and/or a surface of a transmitting member provided closer to a side of a subject in an optical path than the image pickup device, the subject light passing through the transmitting member, comprising:
   a detecting section to detect an orientation of the camera; and
   a judgment section to determine whether the cleaning section performs a removal operation for the particles in accordance with a value detected by the detecting section
   wherein the cleaning target is oriented such that a surface normal to the cleaning target agrees with a vertically upward direction when the camera is in a normal position.

2. The camera according to claim 1, wherein:
   the judgment section determines that the cleaning section does not perform the removal operation for the particles when the surface normal to the cleaning target is oriented vertically upwards.

3. The camera according to claim 1, further comprising:
an ejecting section to eject the particles dropped by the cleaning section; and
a particle holding section to collect and hold the particles,
wherein the judgment section determines that the cleaning section does not perform the removal operation for the particles when the ejecting section and the particle holding section are not situated in a direction in which the particles are dropped by the cleaning section.

4. The camera according to claim 3, further comprising:
a mirror section upon which light from the subject is incident, the mirror section reflecting the light to the cleaning target; and
a rotary mechanism section to rotate the mirror section,
wherein when the judgment section determines that the cleaning section performs the removal operation for the particles, the judgment section causes the rotary mechanism section to rotate the mirror section so as to ensure a path that allows the particles between the cleaning target and the ejecting section to drop.

5. The camera according to claim 1:
wherein the cleaning section comprises a vibrating member to vibrate the cleaning target.

6. The camera according to claim 1, further comprising:
one of an ejecting section to eject the particles dropped by the cleaning section and a particle holding section to collect and hold the particles;
wherein the judgment section determines that the cleaning section does not perform the removal operation for the particles when one of the ejecting section and the particle holding section is not situated in a direction in which the particles are dropped by the cleaning section.

7. The camera according to claim 6, further comprising:
a mirror section upon which light from the subject is incident, the mirror section reflecting the light to the cleaning target; and
a rotary mechanism section to rotate the mirror section,
wherein when the judgment section determines that the cleaning section performs the removal operation for the particles, the judgment section causes the rotary mechanism section to rotate the mirror section so as to ensure a path that allows the particles between the cleaning target and the ejecting section to drop.

* * * * *